United States Patent [19]
Chenot et al.

[11] Patent Number: 4,684,539
[45] Date of Patent: Aug. 4, 1987

[54] PROCESS FOR PRODUCING COATED EUROPIUM ACTIVATED STRONTIUM BORATE PHOSPHORS

[75] Inventors: Charles F. Chenot, Towanda; Leslie F. Gray, Sayre, both of Pa.; Michael A. Krebs, Waverly, N.Y.

[73] Assignee: GTE Products Corporation, Stamford, Conn.

[21] Appl. No.: 892,236

[22] Filed: Aug. 4, 1986

[51] Int. Cl.$^4$ ............................................. B05D 5/06
[52] U.S. Cl. ..................................... 427/64; 427/157; 427/215; 427/343; 427/372.2; 427/399; 427/419.1; 427/419.2
[58] Field of Search .............. 427/64, 157, 215, 372.2, 427/399, 419.2, 419.1, 343; 252/301.44, 301.4 R

[56] References Cited
U.S. PATENT DOCUMENTS 3,314,871 4/1967 Heck et al. ............................. 427/64
3,619,265 11/1971 Hammond et al. .................... 427/64
4,565,948 1/1986 Kimura et al. ............... 252/301.4 F Primary Examiner—Norman Morgenstern
Assistant Examiner—Janyce A. Bell
Attorney, Agent, or Firm—Donald R. Castle; L. Rita Quatrini

[57] ABSTRACT

A process is disclosed for producing a europium activated strontium borate phosphor having a strontium containing coating. The process involves washing a europium activated strontium borate phosphor with a solution of strontium hydroxide to produce a first washed phosphor followed by removing the first washed phosphor from the resulting wash solution. The first washed phosphor is washed with a wash solution selected from the group consisting of ammonium fluoride in alcohol, ammonium bifluoride in alcohol, and a strontium salt in ammonium hydroxide, followed by removing the resulting second washed phosphor from the resulting wash solution. The second washed phosphor is then heated to produce the coated phosphor.

7 Claims, No Drawings

PROCESS FOR PRODUCING COATED EUROPIUM ACTIVATED STRONTIUM BORATE PHOSPHORS

BACKGROUND OF THE INVENTION

This invention relates to a process for producing coated europium acrivated strontium borate phosphors. More particularly it relates to a process for producing europium activated strontium borate phosphors coated with a strontium containing coating.

A phenomenon observed during the lamp lehring process with eropium activated stontium borate, using both the organic and water based binder systems, is the formation of brown phosphor discoloration and glazing of the glass. This phenomenon is associated with the surface activity of the phosphor where it is exposed during the lehring phase of lamp manufacturing. The brown discoloration appears to be associated with carbon being trapped on the phosphor surface.

Elimination of the boric acid and preventing an interaction of the phosphor with the binder would be desirable.

SUMMARY OF THE INVENTION

In accordance with one aspect of this invention, there is provided a process for producing a europium activated strontium borate phosphor having a strontium containing coating. The process involves washing a europium activated strontium borate phospher with a solution of strontium hydroxide to produce a first washed phosphor followed by removing the first washed phosphor from the resulting wash solution. The first washed phosphor is washed with a wash solution selected from the group consisting of ammonium fluoride in alcohol, ammonium biflouride in alcohol, and a strontium salt in ammonium hydroxide, followed by removing the resulting second washed phosphor from the resulting wash solution. The second washed phosphor is then heated to produce the coated phosphor.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The starting phosphors of this invention are typically europium activated strontium borates. The preferred starting phosphor is Type 2051 manufactured by the Chemical and Metallurgical Division of GTE.

The starting phosphor is first washed in a solution, preferably saturated solution of strontium hydroxide. This is generally done in a number of wash steps to produce a first washed phosphor. The washing is done primarily to remove residual boric acid which is present on the surface of the phosphor particles as a result of the phosphor manufacturing process. In this washing step, strontium hydroxide reacts with the boric acid to produce strontium hexaborate which is more soluble than the strontium borate phosphor itself.

In accordance with a preferred embodiment, the strontium hydroxide washing operation is carried out while deagglomerating the phosphor. The deagglomeration results in a homogeneous washing and in the subsequently applied coating being homogeneous. Preferably the washing with deagglomeration is done by milling such as in a ball mill for a sufficient time to accomplish removal of the major portion of the boric acid from the phosphor and to accomplish the deagglomeration of the phosphor. The preferred length of time of washing in a ball mill is about ½ hour. Actual mill times are determined by the hardness of the phosphor. Phosphor hardness is a function of firing time, firing temperature and composition. Thus milling times are a function of parameters independent of coating requirements and, in fact, evermilling may substantially reduce final lamp efficiency.

Since it is essential that surface boric acid be minimized on the phosphor, additional strontium hydroxide aqueous washes are required after the initial mill washing. These are done by stirring a mixture of mill washed phosphor and a hot strontium hydroxide water solution in a container, without milling media, for preferably about 15 minutes. This procedure is done preferably a minimum of two times and is then followed by hot water rinses to remove excess strontium hydroxide and strontium hexaborate. It is preferable that no more than about 3 consecutive water washes be put on the strontium hydroxide washed phosphor to avoid degradation of the phosphor.

The final wash solution is then removed from the first washed phosphor by any standard technique such as filtration.

At this point the first washed phosphor can be dried to remove water. It can also be screened to remove any out of size material.

The strontium hydroxide washing reduces phosphor hydrolysis by the elimination of excess boric acid and by increasing the ratio of Sr to B on the phosphor surface.

To illustrate the importance of washing with strontium hydroxide the following brightness data is presented for lamps having the europium activated strontium borate phosphor. The data show that strontium hydroxide washed phosphers have a high brightness as opposed to phosphors washed with only water.

| Wash | Relative UV Emission Units | |
|---|---|---|
| | 0 hour | 100 hour |
| None | Lamps with the unwashed phosphor turn grey to brown and no brightness readings are obtained. | |
| Water only | 2318 | 2252 |
| Strontium Hydroxide | 3409 | 3315 |

The first washed phosphor is then washed with a wash solution which results in a second washed phosphor. The wash solution can be a solution of ammonium fluoride in alcohol or ammonium bifluoride in alcohol to subsequently produce a strontium fluoride coating, or a solution of a strontium salt dissolved in ammonium hydroxide to subsequently produce a strontium peroxide coating.

To produce the strontium fluoride coating, the first washed phosphor is washed with a solution of ammonium fluoride and an alcohol or ammonium bifluoride in alcohol. The alcohol is chosen for its ability to dissolve the quantity of ammonium fluoride and/or ammonium bifluoride used in the process, and for its ability to be removed completely on heating. The preferred alcohol is denatured ethyl alcohol because of convenience. A preferred washing technique with strontium fluoride will be apparent in the example.

The resulting second washed phosphor is then separated from the resulting wash solution by any standard technique such as filtration.

The second washed phosphor is then heated to form the coated phosphor. The temperature is critical in formation of the strontium fluoride coating. The temperature range necessary to drive off excess organics is from about 450° C. to about 550° C. The preferred temperature is about 500° C.±10° C.

If the coating is to be strontium peroxide, the first washed phosphor is contacted with a solution of a strontium salt dissolved in ammonium hydroxide. The preferred strontium salt is strontium nitrate. The strontium nitrate is dissolved in ammonium hydroxide in a weight ratio of preferably about 1 to 1. The strontium nitrate-ammonium hydroxide solution is preferably heated to about 55° C. A temperature of about 55° C. is required because some heat is necessary for the strontium nitrate and ammonium hydroxide to react to form strontium peroxide which will eventually be the coating on the phosphor. However, it is important that the solution not be heated much above about 55° C. because excessive heat causes the strontium peroxide to decompose. The first washed phosphor is then contacted with this solution.

The heating of the second washed phosphor is done in essentially the same manner as described for the strontium fluoride phosphor. Upon heating, the strontium peroxide is deposited as a coating on the resulting second washed phosphor particles.

The strontium peroxide coating is used to subsequently prevent the interaction between the final phosphor and binder during the lehring process and to augment the lehring process by adding oxygen to the system.

To more fully illustrate this invention, the following non-limiting example is presented.

EXAMPLE 1

Washing the Phosphor with Strontium Hydroxide

About 10 kg of europium activated stronium borate phosphor is placed in a 12 gallon ceramic ball mill with 100 lbs. of alumina cylinders of ¾ inch diameter. About 16 liters of hot (60°-80° C.) deionizd water and about 0.4 kg of $Sr(OH)_2.8H_2O$ are added to the mill and the material is milled for about 15 minutes at about 27 rpm. The mill contents are then separated by pouring through a 60 mesh screen. About 30 kg of the above milled and screened phosphor slurry is placed in a 50 gallon ceramic tank. The phosphor is allowed to settle from the ball mill solution for about 20-30 minutes and the liquor is drawn eff. Hot (60°-80° C.) deionized water is added to the tank to bring the volume up to about 40 gallons. About 1 kg of strontium hydroxide is then added. The mixture is stirred with heating to maintain the water temperature for about 20 minutes. The mixture is then allowed to settle for about 20-30 minutes and the liquid portion is drawn off. The washing with strontium hydroxide is repeated a second time. Hot (about 60°-80° C.) deionized water is added to the tank to bring the volume to about 40 gallons. Rinsing with water is carried out in essentially the same manner as described for the strontium hydroxide washing. The rinsing is done a total of three times. The rinsed phosphor is then suction filtered as dry as possible. The filtered phosphor is then oven dried at about 115° C. for about 16 hours. The dried material is sifted through a 200 mesh screen. The resulting material can be processed further to coat it with the desired coating.

EXAMPLE 2

Applying Strontium Fluoride as a Coating on the Phosphor About 300 g of europium activated strontium borate which has been prewashed with strontium hydroxide is washed in about 600 ml of water in a 1 gallon ball mill for about 30 minutes. The washed phosphor is filtered and dried in a drying oven at about 110° C. The dried phosphor is washed in an alcoholic solution of ammonium fluoride or ammonium bifluoride. Preparation of this solution is as follows: about 6.05 g of $NH_4F$ is dissolved in about 600 ml of ethanol. The phosphor is then added and blended for about 30 minutes. The resulting mixture is filtered and the phosphor is rinsed with alcohol. The phosphor is then dried at about 500° C. in air for about 1 hour or until dry.

EXAMPLE 3

Applying Strontium Peroxide Coating on the Phosphor

A solution of strontium nitrate and ammonium hydroxide is prepared by adding about 250 g of strontium nitrate to about 600 ml of ammonium hydroxide. The resulting solution is heated at about 55° C. About 300 g of europium activated strontium borate which has been prewashed in strontium hydroxide is then slowly blended into this solution. The solution is allowed to cool, and is then filtered and dried in a drying oven at about 110° C.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for producing a europium activated strentium borate phosphor having a strontium containing coating, said process comprising:
   (a) washing a europium activated strontium borate phosphor with a solution of strontium hydroxide to produce a first washed phosphor;
   (b) removing the first washed phosphor from the resulting wash solution;
   (c) washing said first washed phosphor with a wash solution selected from the group consisting of ammonium fluoride in alcohol, ammonium bifluoride in alcohol, and a strontium salt dissolved in ammonium hydroxide, to produce a second washed phosphor;
   (d) removing the second washed phosphor from the resulting wash solution; and
   (e) heating said second washed phosphor to form the final coated phosphor.

2. A process of claim 1 wherein said strontium hydroxide solution is a saturated strontium hydroxide solution.

3. A process of claim 1 wherein said washing with strontium hydroxide is carried out while deagglomerating said phosphor.

4. A process of claim 1 wherein said strontium containing coating is selected from the group consisting of strontium fluoride and strontium peroxide.

5. A process of claim 4 wherein a wash solution selected from the group consisting of ammonium fluoride in alcohol and ammonium bifluoride in alcohol results in a strontium fluoride coating being subsequently formed on said phosphor.

6. A process of claim 4 wherein a wash solution consisting essentially of a strontium salt dissolved in ammonium hydroxide results in a strontium peroxide being subsequently formed on said phosphor.

7. A process of claim 6 wherein said strontium salt is strontium nitrate.

* * * * *